UNITED STATES PATENT OFFICE.

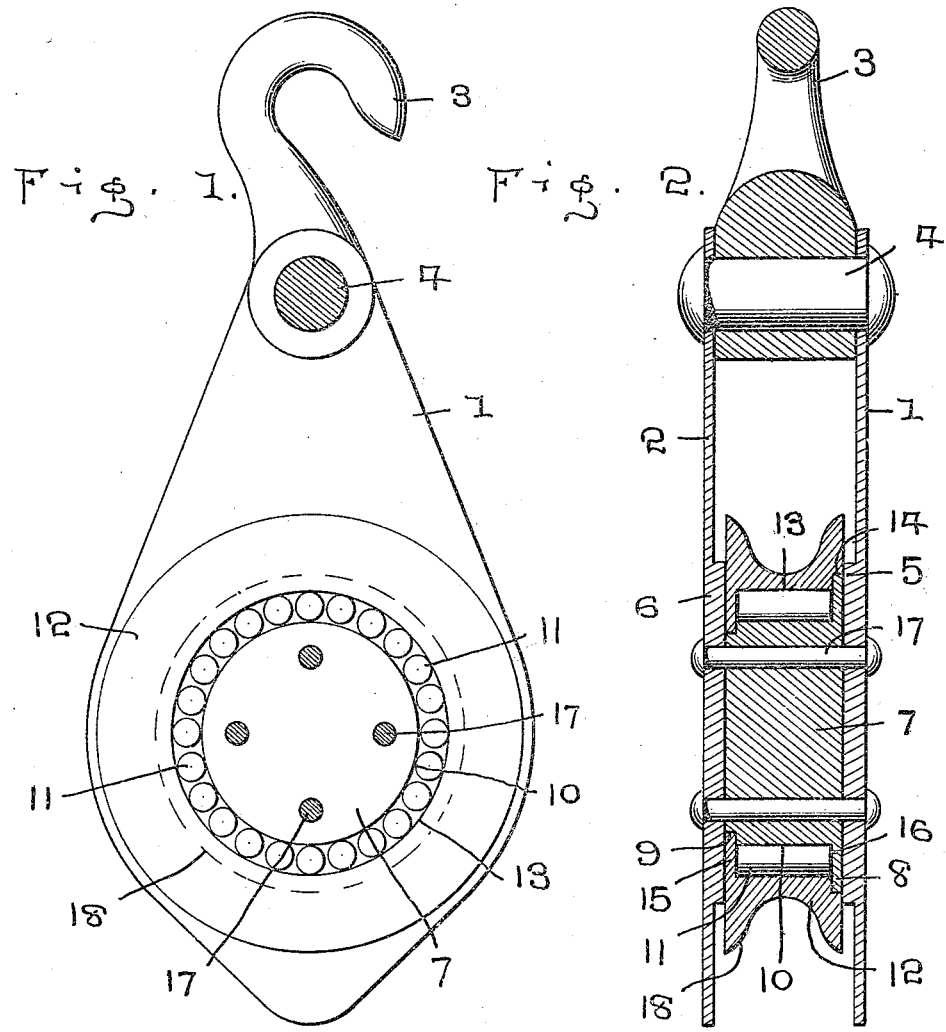

HARRY REED, OF TENINO, WASHINGTON, ASSIGNOR OF ONE-EIGHTH TO F. A. SARGENT AND ONE-EIGHTH TO G. C. RUTLEDGE, BOTH OF TENINO, WASHINGTON.

PULLEY.

961,796.  Specification of Letters Patent.  Patented June 21, 1910.

Application filed July 13, 1909. Serial No. 507,300.

*To all whom it may concern:*

Be it known that I, HARRY REED, a citizen of the United States, residing at Tenino, in the county of Thurston and State of Washington, have invented certain new and useful Improvements in Pulleys; and I do hereby declare the following to be a full, clear, and exact description of the invention, such as will enable others skilled in the art to which it appertains to make and use the same.

My invention relates to new and useful improvements in blocks or pulleys and my object is to provide means for mounting the rotating portion of the pulley on roller bearings and a further object is to provide means for securing the parts of the pulley together.

Other objects and advantages will be hereinafter referred to and more particularly pointed out in the claims.

In the accompanying drawings forming part of this application, Figure 1 is an elevation of the pulley with one of the face plates removed, and, Fig. 2 is a vertical central sectional view through the pulley.

Referring to the drawings in which similar reference numerals designate corresponding parts throughout the several views, 1 and 2 indicate the side plates of my improved pulley, which are preferably substantially pear shaped in side elevation and between the upper ends thereof is introduced a hook 3, which is held in engagement with the side walls by means of a rivet or the like 4.

The inner faces of the lower portion of the side plates 1 and 2 are provided with inward projections 5 and 6, respectively, between which is placed a spindle 7, the end of the spindle adjacent the projection 5 having a peripheral flange 8, while the opposite end thereof is provided with a peripheral channel 9, thus leaving a bearing face 10 between the flange and channel.

Surrounding the spindle 7 and resting on the bearing face 10, are a plurality of bearing rollers 11, which rollers are held in position around the spindle by means of a sheave 12, said sheave being cylindrical and having a bearing face 13 on its inner surface, while at one end of the bearing face is formed a channel 14 to receive the peripheral edge of the flange 8, and at the opposite end of the bearing face is formed an inwardly extending flange 15, which is adapted to enter the channel 9 at the end of the spindle, the flanges 8 and 15 being of such extent as to form a race 16 for the reception of the bearing rollers 11.

After the parts of the block have been properly assembled, they are secured together in any preferred manner, as by introducing bolts 17 through said plates 1 and 2 and the interposed spindle 7, thereby securely attaching the parts of the block together, while the peripheral face of the sheave 12 is preferably provided with a groove 18 to receive a rope or cable and in view of the roller bearings, it will be readily seen that said cable will pass around the sheave and rotate said sheave without creating undue friction.

Of course it will be understood that instead of using the roller bearings as shown, races can be provided for the reception of bearing balls.

What I claim is:

1. In a block of the class described, the combination with a pair of plates each having upon its inner surface inward projections, a spindle secured between said inward projections in offset position from said plates, said spindle having a peripheral flange at one end and a peripheral channel at its opposite end, of a cylindrical sheave having an annular channel at one end adapted to receive the peripheral edge of said flange, said sheave also having an inwardly extending flange, the inner edge of which is adapted to enter the channel of said spindle, said flanges forming a race, the peripheral edge of the flange of said spindle received by the channel of said sheave, breaking joint as it were, with the meeting edges between the flanges of said sheave and the channel of said spindle at the opposite sides of said spindle and said sheave.

2. In a device of the character described, the combination with a pair of plates secured to a hook at their upper ends, the inner faces having projections thereon, a spindle mounted between the projections of said plates, said spindle having a peripheral flange and channel at opposite ends thereof and a bearing surface therebetween; of a sheave revolubly mounted on said spindle, said sheave having a channel and flange at opposite ends with a bearing surface therebetween, said channel and flange registering, respectively, with the flange and channel of said spindle and bearing members mounted in the race formed by the flanges and bearing faces of said spindle and sheave.

In testimony whereof I have signed my name to this specification in the presence of two subscribing witnesses.

HARRY REED.

Witnesses:
C. L. W. GREEN,
S. L. MASTERS.